United States Patent [19]
Lee

[11] Patent Number: 6,164,834
[45] Date of Patent: Dec. 26, 2000

[54] WALL MOUNTED COUPLER FOR OPTICAL FIBER CABLES

[75] Inventor: Hsin Lee, Issaquah, Wash.

[73] Assignee: Fiberon Technologies, Inc., Issaquah, Wash.

[21] Appl. No.: 09/346,714

[22] Filed: Jul. 2, 1999

[51] Int. Cl.[7] .................................................. G02B 6/38
[52] U.S. Cl. .............................. 385/56; 385/58; 385/60; 385/90
[58] Field of Search ................................ 385/56, 76, 78, 385/60, 58, 90, 140; 439/540.1

[56] References Cited

U.S. PATENT DOCUMENTS 5,428,703  6/1995  Lee ............................................. 385/78

*Primary Examiner*—Phan T. H. Palmer
*Attorney, Agent, or Firm*—Delbert J. Barnard

[57] ABSTRACT

A first coupler part (12) is fastened to a wall (W) by a first pair of screw fasteners (32, 34). The screw fasteners (32, 34) have heads that bear against surface portions of the first coupler part (12) that immediately surround openings (28, 30) that receive the screw fasteners (32, 34). A second coupler part (14) is connectable to the surface (20) of first coupler part (20) that is directed away from the wall (W). When the second coupler part (14) is moved against the first coupler part (12), the heads of the screw fasteners (32, 34) enter into enlarged openings (68, 70) in the second coupler part (14). This allows the surface (48) of the second coupler part (14) to be moved against the surface (20) of the first coupler part (12). The second pair of fasteners (40, 42) are used to connect the second coupler part (14) to the first coupler part (12). Or, the second screw fasteners (40, 42) may extend through openings in the first coupler part and screw into openings in the wall (W). Either way, the second coupler part (14) can be quickly and easily detached from the first coupler part (12) by simply removing the two screws (40, 42). The second coupler part (14) can be thus removed for purpose of the pair or placement without disturbing the connection between an optical fiber cable (82) and the first coupler part (12).

9 Claims, 3 Drawing Sheets

WALL MOUNTED COUPLER FOR OPTICAL FIBER CABLES

TECHNICAL FIELD

The present invention relates to optical fiber technology. More particularly, it relates to the provision of structure that is connectable to a wall or panel and is adapted to connect together two optical fiber cables, one coming from one side of the wall or panel and the other coming from the opposite side of the wall or panel.

BACKGROUND OF THE INVENTION

Optical fibers are used extensively in state-of-the-art systems for transmitting information rapidly from one location to another. In these systems, it is necessary to transfer an optical signal from one optical fiber cable to another. Where two optical fibers meet, there is an optical fiber connector for each optical fiber cable and structure for holding the connectors in such a way that the end of a first optical fiber in a first cable is properly aligned with the end of an optical fiber end in a second cable. Herein, this structure is termed a "coupler."

It is common to connect optical fiber cables together where they meet at a wall of a cabinet or housing or at a panel. A first optical fiber cable comes to the wall or panel from a first side of the wall or panel. A second optical fiber cable comes to the wall or panel from the second or opposite side of the wall or panel. In the prior art, the first cable is connected to a first member or coupler part. The second cable is connected to a second member or coupler part. The two coupler parts are brought into contact with each other and screw fasteners are used to connect them together and to the wall or panel. The screw fasteners extend through both coupler parts and connect both coupler parts to the wall. The screw fasteners are removed when it becomes necessary to repair some aspect of the coupler. In the prior art couplers, when the screw fasteners are removed, the two coupler parts are both detached from the wall or panel and are also detached from each other. When the screw fasteners are removed, the coupler parts are in a freely moving state. As a result, the optical fiber connections are susceptible to damage and often are damaged. Also, the assembly and disassembly of the coupler parts is a complex procedure.

A principal object of the present invention is to provide an improved coupler making it easy to connect the optical cables and their connectors to each other and to the wall or panel. It is an object to provide an arrangement wherein fasteners can be easily and quickly manipulated for purposes of separating the coupler parts for repair purpose in a way that avoids free movement of the optical fiber connectors.

BRIEF SUMMARY OF THE INVENTION

The coupler of the present invention is adapted for coupling an end of a first optical fiber that is on a first side of a wall or panel to and end of the second optical fiber that is on the second or opposite side of the wall or panel. The coupler is basically characterized by first coupler part having a first base plate that is on the second side of the wall or panel. The first base plate has a first side and a second side. It also has a cable-end support for an end portion of a first optical fiber cable. This cable-end support extends from the first base plate through an opening in the wall or panel to a position on the first side of the wall or panel. The first side of the first base plate contacts the second side of the wall. The first base plate and the cable-end support include an axial opening. According to the invention, at least one fastener extends from the second side of the first base plate, through the first base plate and into the wall or panel, for connecting the first coupler part to the wall or panel, with the first holder positioned in the opening in the wall.

A second coupler part has a second base plate that is positioned outwardly of the second side of the first base plate for the first coupler part. The second base plate has a first side that is contacting the second side of the first coupler part, and a second side. The second coupler part has a second cable-end support for an end portion of the second optical fiber cable. This second cable-end support projects outwardly from the second side of the second coupler part, away from the wall. The second base plate and the second cable-end support include an axial opening. At least one fastener extends from the second side of the second base plate, through the second base plate and at least into the first base plate, for detachably connecting the second coupler part to the first coupler part. When attached, the coupler parts are in a position placing the axial opening in the second base plate and second cable-end support in axial alignment with the axial opening in the first base plate and first cable-end support. As a result of this construction, a first optical fiber cable can be connected to the first cable-end support, with the end of the first optical fiber exposed and positioned within the coupler. A second optical fiber cable can be connected to the second cable-end support with an end of a second optical fiber exposed and positioned within the coupler contiguous the exposed end of the first optical fiber. The second coupler part can be connected to and disconnected from the first coupler part while the first optical fiber cable and the first coupler part remain connected to the wall or panel.

In preferred form, a first pair of two screw fasteners are used to connect the first base plate of the first coupler part to the wall or panel. A second pair of screw fasteners are used to connect the second base plate of the second coupler part to the first base plate of the first coupler part and to the wall or panel. The second two screw fasteners may screw into the second base plate or may extend through openings in the second base plate and screw into the wall or panel. In any event, when they are removed, the base plate of the second coupler part is detached from the base plate of the first coupler part, and from the wall.

According to an aspect of the invention, the first two screw fasteners have enlarged heads that contact and bear against bearing surfaces on the first base plate of the first coupler part that immediately surrounds the fastener receiving openings in the first base plate. When these screw fasteners are tightened, their heads exert clamping pressure on the first base plate.

Preferably also, the base plate of the second coupler part includes enlarged openings that are registerable with the heads of the first two screw fasteners. This allows the base plate of the second coupler part to be placed flush on the base plate of the first coupler part. As the base plate of the second coupler part moves towards the base plate of the first coupler part, the heads of the screw fasteners move into the enlarged openings in the base plate of the second coupler part.

The two screw fasteners for securing the second coupler part to the first coupler part and the wall have heads that bear against surface portions of the base plate of the second coupler part that immediately surround openings in the base plate for screw fasteners. Such surface portions may be inset into openings that are sized to receive the heads of the second two screw fasteners, so that the heads are countersunk into the base plate of the second coupler part.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like reference numerals and letters refer to like parts throughout the several views, and.

DETAILED DESCRIPTION OF THE INVENTION

Figure 1:
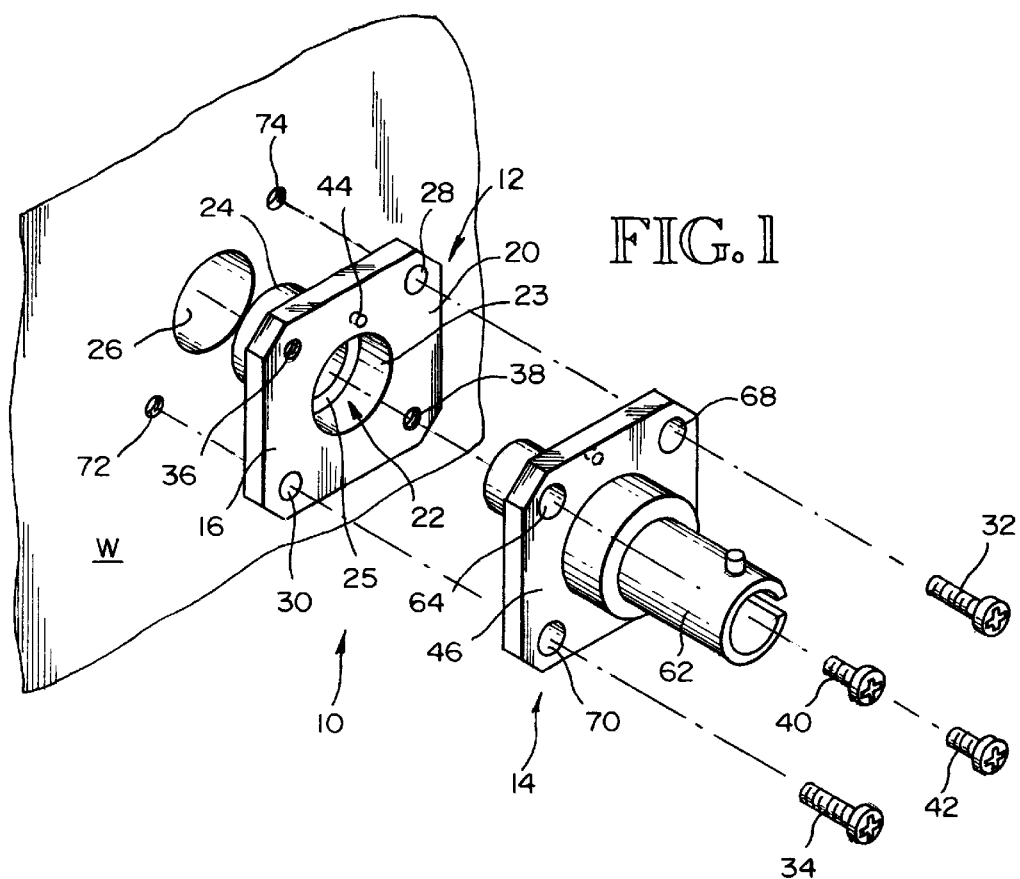
FIG. 1 is an exploded pictorial view of a coupler structure exemplifying the present invention, such view showing a first coupler part in a spaced relationship from a wall and an opening in the wall, and showing a second coupler part in a spaced relationship from the first coupler part, and showing screw fasteners in a spaced relationship from screw fastener openings in the first and second coupler parts.
Figure 2:
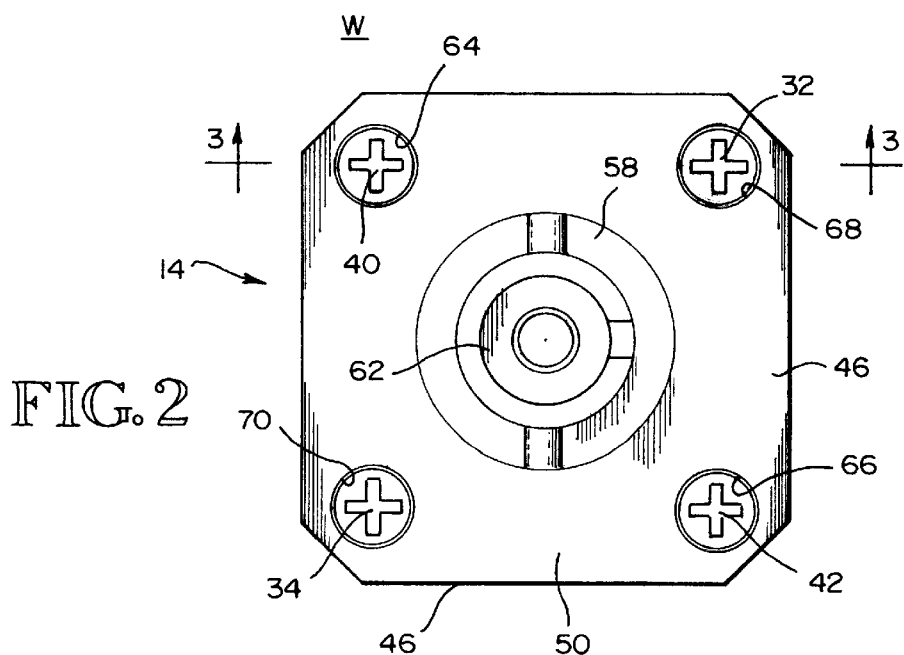
FIG. 2 is an end elevational view looking perpendicular to the outer end of the second coupler part, showing it connected to the first coupler part and showing both coupler parts connected to a wall or panel.

Referring more specifically to the several figures of the drawing, the illustrated embodiment is a coupler 10 comprising a first coupler part 12 that is connectable to a wall W and a second coupler part 14 that is connectable to the first coupler part 12.

Figure 3:
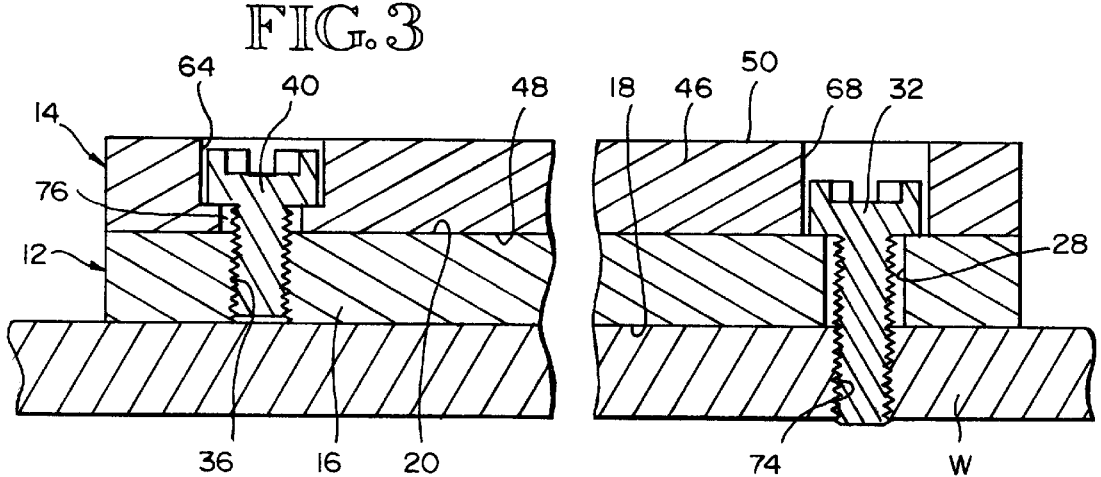
FIG. 3 is a sectional view taken substantially along line 3—3 of FIG. 2, such view being broken away at its center to allow the view to be shortened in the horizontal direction.
Figure 4:
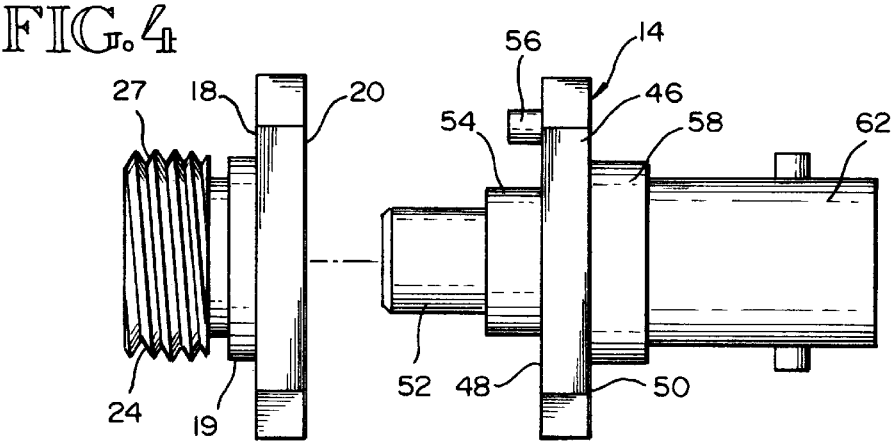
FIG. 4 is an exploded side elevational view of the first and second coupler parts, such view showing the first coupler part equipped with a cable-end support in the nature of a threaded nipple, and showing the second coupler part equipped with a cable-end support in the form of a receptacle for a connector plug.
Figure 5:
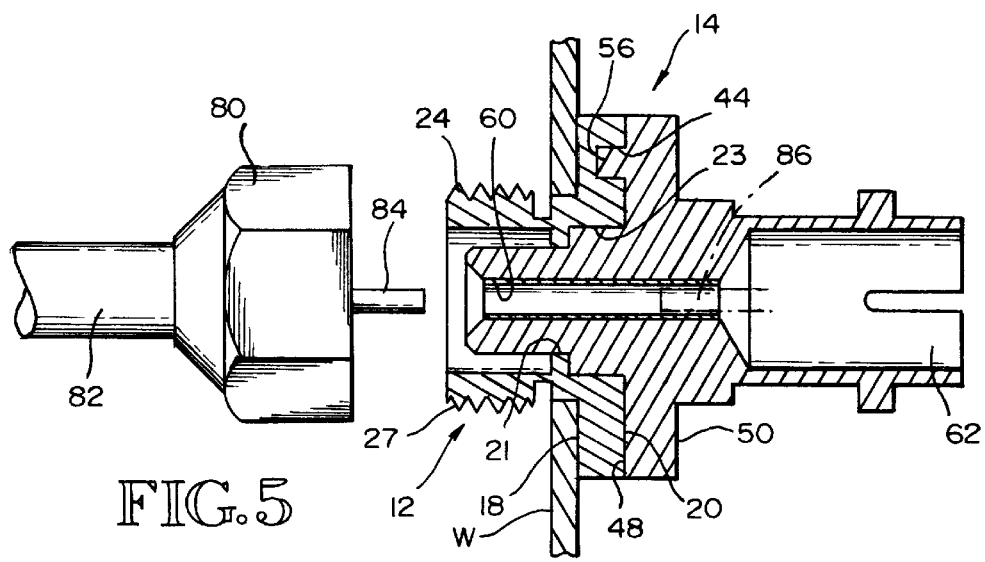
FIG. 5 is a longitudinal sectional view of the first and second coupler parts assembled on a wall, such view including a fragmentary end portion of an optical fiber cable and a connector, both shown in elevation.
Figure 6:
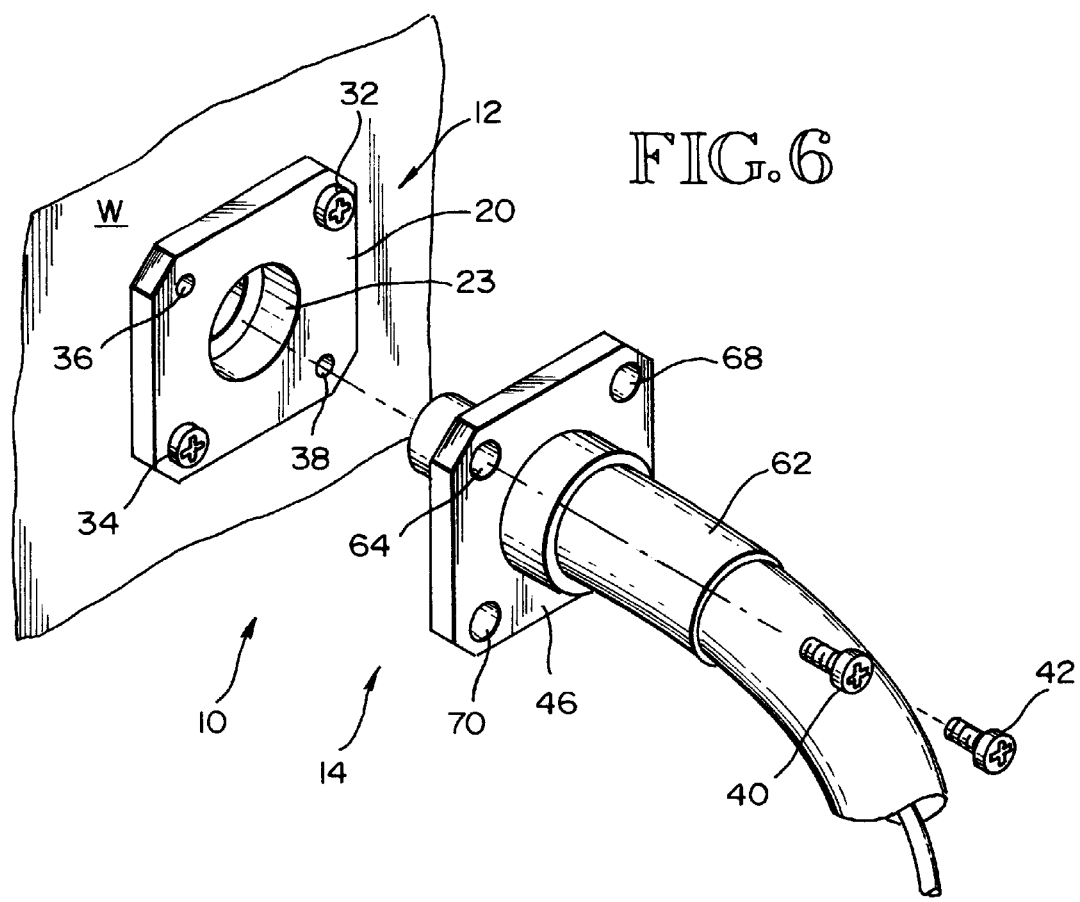
FIG. 6 is a view like FIG. 1, but showing the first coupler part connected to the wall and showing the second coupler part connected to an end portion of an optical fiber cable.

The first coupler part 12 includes a base plate 16 having first and second sides 18, 20 (FIGS. 3 and 4) and a center opening 22. Center opening 22 has two diameters. It has a smaller diameter 21 adjacent side 18 and a larger diameter 23 adjacent side 20. As shown by FIGS. 1 and 5, an annular shoulder 25 is formed where diameter 23 meets diameter 21. A tubular nipple 24 or other cable-end support extends from the first 18 of the base plate 16 towards and into an opening 26 in the wall W. An annular boss 19 projects from side 18 at the base of the nipple 24. Nipple 24 has a center opening that is aligned with center opening 22 in base plate 20. Nipple 24 has external threads 27 adjacent its end opposite the base plate 16. The first and second sides 18, 20 of base plate 16 are planar and parallel to each other (FIGS. 3–5). The perimeter shape of base plate 16 is square with beveled corners. The corner regions are provided with axial openings. Openings 28, 30 receive screw fasteners 32, 34 that connect the first coupler part 12 to the wall W. Openings 36, 38 include screw fasteners 40, 42 that connect coupler part 14 to coupler part 12. A locator-pin socket 44 may be provided in base 16, on side 20, for example, between openings 28, 36.

The second coupler part 14 includes a base plate 46 having first and second sides 48, 50 (FIGS. 3 and 4). These sides 48, 50 are planar and parallel to each other (FIGS. 3–5). Part 14 includes a tubular projection on side 48, projecting from side 48 to the center opening 22 in part 12. The projection has a first, small diameter end portion 52 that is sized to fit through opening 21 in part 12. It also includes a larger diameter base portion 54 that is sized to fit within opening 23 in part 12. Base 46 also includes a locator-pin 56 that is sized to fit within locator opening 44 in part 12. Part 14 includes a center portion on side 50 that projects from side 50 in a direction opposite the projection of portions 21, 23 from side 48. As shown by FIG. 5, a center opening 60 extends axially through portions 46, 52, 54, 58 of coupler part 14. A tubular connector socket 62 or other cable-end support may project axially outwardly from base 58, away from side 50. Socket 62 has a hollow interior that communicates with center opening 60 (FIG. 5).

Preferably, base plate 16 of coupler part 12 and base plate 46 of coupler part 14 are substantially the same in size and shape. Base plate 46 includes four corner openings 64, 66, 68, 70 that are alignable with openings 36, 38, 28, 30 in base plate 16. FIG. 3 shows opening 64 in base plate 46 in alignment with opening 36 in base plate 16. It also shows opening 68 in base plate 46 in alignment with opening 28 in base plate 16. The relationship of opening 70 in base plate 46 with opening 30 in base plate 16 is the same as the relationship of opening 68 in base plate 46 with opening 28 in base plate 16. The relationship of opening 66 in base plate 46 with opening 38 in base plate 16 is the same as the relationship of opening 64 in base plate 46 with opening 36 in base plate 16.

Coupler part 12 is moved towards wall W to move the threaded nipple 24 into and through the opening 26. Also, the opening 30 in base plate 16 is moved into alignment with opening 72 in wall W and opening 28 in base plate 16 is moved into alignment with opening 74 in wall W. Openings 72, 74 are internally threaded to receive the threads of fasteners 34, 32.

As shown by FIG. 3, the head of fastener 32 rests on and bears against side 20 of base plate 16 where side 20 immediately surrounds the opening 28. The same is true with fastener 34. Its head bears against the portion of side 20 that immediately surrounds opening 30. The use of two spaced apart fasteners 32, 34 provides a firm connection of coupler part 12 to the wall W.

Following the connection of coupler part 12 to wall W, the coupler part 14 can be moved into engagement with the coupler part 12. The projecting center portion 52, 54 of coupler part 14 is moved into the two part opening 23, 21 in coupler part 12. The locator-pin 56 on side 48 of base plate 14 is moved into locator-pin opening 44 on side 20 of coupler part 12. Also, the corner openings 64, 66 in base plate 46 are aligned to receive in them the heads of fasteners 32, 34. Thus, coupler part 14 can be easily and quickly moved towards mounted coupler part 12, with the projecting portions 52, 54 entering the center opening parts 23, 21. Because the two base plates 16, 46 are substantially identical in size and shape, it is only necessary to align the outer boundaries of base plate 46 with the outer boundaries of base plate 16. A small amount of additional movement of coupler part 14 may be necessary to locate locator-pin 46 within locator-pin opening 44. The entry of the head portions of fasteners 32, 34 into openings 68, 70 also helps correctly align coupler part 14 with coupler part 12 and it does it in a very expedient way. Once proper alignment is achieved, the inner side 48 of base plate 46 is against the outer 20 of base plate 16 (FIGS. 3 and 5). Next, the screw fastener 40 is inserted through opening 64 in base plate 46 and into threaded opening 36 in base plate 16. In similar fashion, screw fastener 42 is inserted through opening 66 in base plate 46 and into internally threaded opening 38 in base plate 16. These fasteners 40, 42 are then tightened. As shown by FIG. 3, opening 64 has a large diameter outer portion sized to receive the head of fastener 40 and a smaller diameter opening 76 that is smaller than the head of screw fastener 40 but larger than the threaded shank of screw fastener 40. Fastener opening 66 is constructed in the same way. It has a large diameter outer end socket portion that is sized to receive the head of the screw fastener 42. It includes a smaller diameter opening sized to pass the threaded shank portion of screw fastener 42 but not the head portion of portion 42. Owing to the construction that has just been described, the heads of the fasteners 40, 42 bear on shoulders within the openings 64, 66 and clamp the base plate 46 to the base plate 16. In this embodiment, threaded openings 36, 38 are provided into base plate 16. However, according to the invention, the threaded shank portions of the fasteners 40, 42 may be longer than pictured and threaded openings for them may be formed in the wall W. In this modified embodiment, the threaded shank portion of the fasteners 40, 42 are fittable through openings 36, 38 that are not internally threaded. Regardless of whether the screw fasteners 40, 42 screw into the base plate 16 or the wall W, the screw fasteners 40, 42 serve to connect the second coupler part 14 to the assembly of the first coupler part 12 and wall W. Coupler part 14 can be quickly and easily disconnected from coupler part 12 and wall W by simply removing the two screw fasteners 40, 42. Once screw fasteners 40, 42 are removed, the outer coupler part 14 is free from connection to the inner coupler part 12 and/or the wall W. Coupler part 14, and any optical fiber cable connected to it, can be disconnected from coupler part 12 and wall W while coupler part 12 and the optical fiber cable that is connected to it remains connected to the wall W.

Coupler part 12 is shown to include an externally threaded nipple 24. FIG. 5 shows a connector fitting 80 at the end of a cable 82. Fitting 80 can be connected to the threads 27 of nipple 24 and in the process and end portion of an optical fiber cable 84 will enter into opening 60, in a position to be mated with an end portion 86 of another optical fiber cable that is coupled to coupler part 14.

FIG. 5 includes a broken line showing of end portion 86 of the second optical fiber cable. It also shows a bayonet-type cable-end support 62. However, it is to be understood that the cable-end support 24 on coupler part 12 and the cable-end support 62 on coupler part 14 can vary substantially. Any existing or yet to be developed cable-end support can be used without departing from the invention. For example, the cable-end support 62 may be a threaded nipple like threaded nipple 24. Instead of a threaded nipple 24, the cable-end support for coupler part 12 may be a bayonet-joint connector like element 62 or, either one or both of the cable-end supports may be a receptacle that is adapted to receive a prong or other plug-in element that is at the end of the cable. The invention relates to the independent connection of the two coupler parts 12, 14 to the wall W. Both coupler parts 12, 14 are placed on the same side of wall W. However, coupler part 16 is connected to an optical fiber cable 82 that is on a first side of the wall W. The coupler part 14 is connected to a cable that comes from the opposite side of the wall W. The coupler assembly 12, 14 of the invention makes it possible to easily connect and disconnect the two cables from each other without having to remove both coupler parts 12, 14 from the wall W. The invention also makes it unnecessary for one to have access to the side of wall W on which cable 82 is situated. In most installations, at least, this side of the wall W will represent the inside of a cabinet or housing. Normally, access to this side of the wall W is difficult to achieve. If the end portion of the cable 82 where to be disconnected from the wall W, it might fall down into the housing and be difficult to retrieve.

The illustrated embodiments are only examples of the present invention and, therefore, are non-limitive. It is to be understood that many changes in the particular structure, materials and features of the invention may be made without departing from the spirit and scope of the invention for example, the screw fasteners may be replaced by some type of fastener that can be inserted through the openings and rotated, or merely inserted through the opening, to cause a connection.

Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A coupler for coupling an end of a first optical fiber that is on a first side of a wall to an end of a second optical fiber that is on the second side of the wall, said wall including an opening, and said coupler comprising:

a first coupler part having a first base plate that is on the second side of the wall, said first base plate having a first side and a second side, and a first cable-end support for an end portion of the first optical fiber cable, extending from the first base plate through the opening in the wall to a position on the first side of the wall, said first side of said first base plate contacting the second side of the wall, and said first base plate and said cable-end support including an axial opening;

at least one fastener extending from the second side of the first base plate, through the first base plate and into the wall, and connecting the first coupler part to the wall, with the first holder positioned in the opening in the wall;

a second coupler part having a second base plate that is positioned outwardly of the second side of the first coupler part, said second base plate having a first base plate for the side that is contacting the second side of the first coupler part and a second side, said second coupler part having a second cable-end support for an end portion of the second optical fiber cable, projecting outwardly from the second side of the second coupler part, away from said wall, said second base plate and said second cable-end support including an axial opening; and at least one fastener extending from the second side of the second base plate, through the second base plate and at least into the first base plate, and detachably connecting the second coupler part to the first coupler part in a position placing the axial opening in the second base plate and second holder, in axial alignment with the axial opening in the first base plate and first holder; and wherein the first optical fiber cable can be coupled to the first cable-end support with the end of said first optical fiber exposed and positioned within the coupler, and the second optical fiber cable can be coupled to the second cable-end support with an end of said second optical fiber exposed and positioned within the coupler contiguous the exposed end of the first optical fiber;

wherein the second coupler part can be connected to and disconnected from the first coupler part while the first optical fiber cable and the first coupler part are connected to the wall.

2. The coupler of claim 1, comprising two screw fasteners extending from the second side of the first base plate, through the first base plate and into the wall, for connecting the first coupler part to the wall.

3. The coupler of claim 2, wherein the screw fasteners that connect the first coupler part to the wall extending through openings in the first base plate and enlarged heads that contacts and bears against bearing surfaces on the first base plate surrounding said openings.

4. The coupler of claim 3, wherein the second base plate includes openings in axial alignment with the heads of the screw fasteners that connect the first coupler part to the wall, said openings being larger in diameter than said heads and said heads being within said openings.

5. The coupler of claim 4, wherein the second base plate includes countersinks for the heads of the screw fasteners that connect the second base plate to the first base plate, and annular bearing surfaces in the countersinks against which the heads of the screw fasteners bear.

6. The coupler of claim 3, wherein the screw fasteners that connect the second base plate to the first base plate extend through openings in the second base plate and include heads that contact a bearing surface on the second base plate.

7. The coupler of claim 2, comprising two screw fasteners extending from the second side of the second base plate, through the second base plate and into the first base plate, for detachably connecting the second coupler part to the first coupler part.

8. The coupler of claim 1, wherein the second coupler part includes a tubular member at its center that extends from the first side of the second base plate into the axial opening in the first base plate and first cable-end support.

9. The coupler of claim 1, wherein one coupler part includes an indexing pin and the other includes an indexing socket positioned to receive the indexing pin when the two coupler parts are in proper register.

* * * * *